Patented July 9, 1946

2,403,453

UNITED STATES PATENT OFFICE 2,403,453

MINERAL OIL COMPOSITION

Ferdinand Philip Otto, Woodbury, N. J., assignor to Socony-Vacuum Oil Company, Incorporated, a corporation of New York No Drawing. Application September 9, 1942, Serial No. 457,763

19 Claims. (Cl. 252—51.5)

This invention has to do with the improvement of mineral oil fractions by the use of a novel class of reaction products or compounds which, when admixed with such a mineral oil in minor proportions, will prevent or delay undesirable changes taking place in the oil.

As is well known to those familiar with the art, substantially all the various fractions obtained from mineral oils and refined for their various uses are susceptible to oxidation. This susceptibility and the manner in which oxidation manifests itself within the oil varies with the type and degree of refinement to which the oil has been subjected and with the conditions under which it is used or tested. In other words, the products formed in an oil fraction as a result of oxidation and the degree to which they are formed depends upon the unstable or catalytic constituents present in the unrefined oil, and the extent to which these various unstable constituents or constituents which may act as oxidation catalysts have been removed by the refining treatment.

The use of oxidation inhibitors for the purpose of stabilizing mineral oil fractions against the deleterious effects of oxidation is well known. As the action of these inhibiting materials is apparently catalytic, the problem of their development is a difficult one and is evidently influenced to a large degree by the oxidizable constituents which are in the oil following a particular refining treatment. For example, a particular inhibitor, or class of inhibitors may be effective to stabilize a highly refined oil (one refined with large quantities of fuming sulfuric acid) against acid formation while the same inhibitor may have no appreciable effect upon acid, color or sludge formation in a moderately refined oil (such as one refined with a moderate quantity of sulfuric acid), and vice versa. This same inhibitor may or may not be effective in inhibiting acid, sludge, and color formation in a solvent-refined oil and may or may not be effective to inhibit the corrosive action of a solvent-refined oil toward metals such as, for example, the various normally corroded alloys typified by those used in cadmium-silver bearings.

Numerous compounds and compositions have been proposed for use as inhibitors in mineral oil fractions. Typical of such inhibitors are those formed by reactions of various amines and aldehydes, and of various amines, aldehydes and hydroxyaromatic compounds. Inhibitors of this class, or classes, are of varying degrees of effectiveness and are, in general, effective only in a specific type of oil, such as a moderately refined oil.

The present invention is predicated upon the discovery of a class of reaction products or compounds which possess the property of stabilizing all mineral oil fractions against the deleterious effects of oxidation. The improving agents contemplated herein are obtained by the reaction of hydroxyaromatic compounds, ammonia and aldehydes having more than one carbon atom. Of this broad class of reaction products or compounds, however, two sub-classes are preferred. One such sub-class of reaction products is that obtained by the reaction of substantially one equivalent of a hydroxyaromatic compound, one equivalent of ammonia and two equivalents of said aldehyde. Particularly preferred are those reaction products of a second sub-class which are obtained by the reaction of substantially one equivalent of a hydroxyaromatic compound and two equivalents of an aldehyde-ammonia condensation product. Reaction products of this latter and particularly preferred sub-class are less resinous, and, accordingly, more soluble than the other reaction products or compounds broadly contemplated herein.

Typical hydroxyaromatic compounds contemplated for use as one of the three reactants are: phenol, cresol, ethyl phenol, diamyl phenol, wax-phenols, α-naphthol, β-naphthol, wax-alpha- and beta-naphthols, etc. Long - chain aliphatic groups having more than twenty carbon atoms and obtained from petroleum waxes are referred to herein as "wax" groups, and are contemplated herein as preferred substituents of hydroxyaromatics as indicated above.

As defined above, the reaction products or compounds contemplated herein have as one of the three reactants an aldehyde having more than one carbon atom. In short, all aldehydes other than formaldehyde are contemplated herein. For example, my particularly preferred class of reaction products or compounds is that obtained by the reaction of one equivalent of a hydroxyaromatic compound of the group above, and two equivalents of an aldehyde-ammonia condensation product. Formaldehyde does not react with ammonia in the same way, and, accordingly, does not yield similar products, as do other aldehydes. Representative aldehydes which may be used to obtain the reaction products or compounds contemplated herein are acetaldehyde, butyraldehyde, furfuraldehyde, benzaldehyde, toluic aldehyde, etc.

Several typical procedures by which the reaction products or compounds contemplated herein may be prepared are described by the following:

EXAMPLE I

BETA-NAPHTHOL—BENZALDEHYDE-AMMONIA

One mol, 144 grams, of beta-naphthol was dissolved in 220 cc. of 95% ethyl alcohol and to this solution two mols, 212 grams, of benzaldehyde were added. Then, 200 cc. of 95% ethyl alcohol saturated with ammonia was added. The reaction vessel was then closed and the reaction allowed to continue for two hours, after which time the reaction vessel was opened. Unreacted ammonia was allowed to escape and the reaction mixture so formed was allowed to stand for about twelve hours. The condensation product which separated in the form of white needles was filtered with suction, and washed with 50 cc. of alcohol. The condensation product contained about 4.2% of nitrogen in addition to carbon, hydrogen and oxygen.

EXAMPLE II

DIAMYL PHENOL—BENZALDEHYDE-AMMONIA

Gaseous ammonia was introduced into a mixture of 50 grams (0.21 mol) of diamyl phenol, 45.3 grams (0.42 mol) of benzaldehyde and 100 grams of 95% ethyl alcohol at room temperature. After about twenty minutes the temperature rose to 115° F., and during the following hour fell to 95° F., after which the introduction of ammonia was discontinued. The mixture was then gradually heated to 150° F. and maintained at this temperature for about 1½ hours. The mixture was then allowed to cool and stand at room temperature for a few days. The reaction mixture was then diluted with benzol, water-washed and "topped" to 210° C. at 5 mm. pressure in order to remove solvents and unreacted materials. The reaction product contained 3.76% nitrogen.

EXAMPLE III

ALPHA-NAPHTHOL AND BENZALDEHYDE-AMMONIA (a) Benzaldehyde-ammonia

Concentrated NH$_4$OH, 200 cc., was added dropwise to a solution of 106 grams (1 mol) of benzaldehyde in 100 cc. of 95% ethyl alcohol. The reaction mixture during this addition was cooled by means of an ice-bath which was removed after the addition was complete. When the mixture was at room temperature, the crystals which had deposited were filtered and washed with alcohol.

(b) Alpha-naphthol and benzaldehyde-ammonia

The benzaldehyde-ammonia, 149 grams, obtained above in 3 (a) was mixed with 72 grams (0.5 mol) of alpha-naphthol and 200 cc. of 95% ethyl alcohol. The mixture was warmed on a steam-bath until the evolution of ammonia was noticed. On standing overnight at room temperature, a brown resinous material deposited in the reaction vessel. Alcohol was decanted off and the product was washed with fresh hot alcohol. The alcohol suspension was cooled, whereupon the product solidified. The amorphous mass so obtained was a light brown powder when pulverized. It was washed several times with small portions of alcohol to remove unreacted materials. As with all the reaction products contemplated herein, this product contained nitrogen in addition to carbon, hydrogen and oxygen.

EXAMPLE IV

DIAMYL PHENOL—ACETALDEHYDE-AMMONIA

Two hundred cc. of 95% ethyl alcohol saturated with ammonia at 15° C. was added dropwise to a mixture of 117 grams (0.5 mol) of diamyl phenol, 54 grams (1.2 mols) of acetaldehyde, and 200 cc. of absolute ethyl alcohol at approximately 10° C. The mixture was allowed to stand at room temperature for two days and was then "topped" to 115° C. with vacuum to obtain the finished product, a viscous, light-brown oil containing 3.04% nitrogen.

EXAMPLE V

DIAMYL PHENOL AND ACETALDEHYDE-AMMONIA (a) Acetaldehyde-ammonia

Gaseous ammonia was passed slowly into a solution of 100 grams of acetaldehyde in 150 cc. of ether for about two hours. The temperature, during the ammonia addition, was maintained below 150° C. by cooling the reaction vessel by means of an ice-bath. The crystalline precipitate of acetaldehyde-ammonia was filtered from the reaction mixture by suction, washed several times with ether and then dried in a desiccator.

(b) Diamyl phenol and acetaldehyde-ammonia

One-half a mol (117 grams) of diamyl phenol, 300 cc. of absolute alcohol and 61 grams of acetaldehyde-ammonia, obtained above in V(a), were mixed together and the mixture warmed to 45° C. The mixture was then allowed to stand in a stoppered flask at room temperature for 24 hours. The mixture was then filtered and the filtrate was "topped" to 110° C. with vacuum to obtain the product, a light-brown oil containing 3.46% nitrogen.

EXAMPLE VI

WAX-BETA-NAPHTHOL (3–16) AND ACETALDEHYDE-AMMONIA

Seven grams of acetaldehyde-ammonia, obtained above in V(a), 150 cc. of benzol, 35 cc. of ethyl alcohol and 50 grams of wax-beta-naphthol (3–16) obtained according to the procedure outlined in U. S. Patent 2,197,834 were mixed together and the mixture warmed to 45° C. The mixture was then allowed to cool to room temperature and allowed to stand at room temperature for about 16 hours. It was then filtered and the filtrate was "topped" to 150° C. with vacuum to obtain the finished product which contained 1.02% nitrogen.

EXAMPLE VII

β-NAPHTHOL AND ACETALDEHYDE-AMMONIA

A mixture of 72 grams of β-naphthol, 66 grams of acetaldehyde-ammonia, obtained as in V(a), and 200 cc. absolute ethyl alcohol was warmed gently to 45° C. and then allowed to stand for two days in a stoppered flask at room temperature. The flask containing the product was then placed in an ice-salt bath in order to precipitate the product, a white amorphous material. On reprecipitating from ethyl alcohol, a crystalline product was obtained. Recrystallization from ethyl alcohol gave a white crystalline product which contained: 6.47% nitrogen, 78.63% carbon and 6.63% hydrogen.

The effectiveness of the reaction products or compounds contemplated herein is demonstrated by the results of the following tests on oil blends containing small amounts of said reaction products or compounds, and on the oils alone. Results are also provided below for individual reactants, or for reaction products of only two of the three necessary reactants for the reaction products contemplated herein, in order to indicate the superiority of the contemplated reaction products over said reactants and said partial reaction products. It will be noticed that, as aforesaid, these improving agents are effective in more than one type of oil, illustrative of which are the moderately refined and solvent refined oils used in the tests described below.

EXAMPLE VIII

CORROSION TEST

Motor oils, especially those refined by certain solvent-extraction methods, tend to oxidize when submitted to high temperatures to form products that are corrosive to metal bearings. This corrosive action may be quite severe with certain bearings, such as those having the corrosion-susceptibility of cadmium-silver alloys and may cause their failure within a comparatively short time. The following test was used to determine the corrosive action of a motor oil on an automobile connecting rod bearing of the cadmium-silver alloy type.

The oil used consisted of Pennsylvania neutral and residuum stocks separately refined by means of chlorex and then blended with an S. A. E. 20 motor oil with a specific gravity of 0.872, a flash point of 435° F., and a Saybolt Universal viscosity of 318 seconds at 100° F. The oil was tested by adding a section of a bearing containing a cadmium-silver alloy surface and weighing about 6 grams, and heating it to 175° C. for 22 hours while a stream of air was bubbled against the surface of the bearing. The loss in weight of the bearing during this treatment measures the amount of corrosion that has taken place. A sample of the oil containing the improving agent was run at the same time as a sample of the straight oil, and the loss in weight of the bearing section in the inhibited oil can thus be compared directly with the loss of the section in the uninhibited oil. The results obtained in this test are set forth in Table I below.

*Table I*

| Reaction product added | Per cent used | Mgs. loss in weight | |
|---|---|---|---|
| | | Inhibited | Uninhibited |
| Diamyl phenol | ¼ | 44 | 35 |
| Diamyl phenol-benzaldehyde-ammonia | ¼ | 4 | 35 |
| Beta-naphthol | ⅒ | 46 | 35 |
| Beta-naphthol-benzaldehyde-ammonia | ⅒ | 4 | 35 |
| Alpha-naphthol-benzaldehyde-ammonia | ¼ | 2 | 35 |
| Benzaldehyde-ammonia | ¼ | 12 | 46 |
| Do | ⅒ | 23 | 46 |
| Beta-naphthol and benzaldehyde-ammonia | ¼ | 1 | 46 |
| Do | ⅒ | 2 | 46 |
| Alpha-naphthol and benzaldehyde-ammonia | ¼ | 1 | 46 |
| Do | ⅒ | 2 | 46 |
| Diamyl phenol-acetaldehyde-ammonia | ¼ | 0 | 39 |
| Do | ⅒ | 8 | 39 |
| Diamyl phenol and acetaldehyde-ammonia | ¼ | 0 | 31 |
| Do | ⅒ | 1 | 31 |
| Wax beta-naphthol (3-16) and acetaldehyde-ammonia | ½ | 2 | 32 |
| Beta-naphthol and acetaldehyde-ammonia | ¼ | 0 | 31 |
| | ⅒ | 6 | 31 |

In the foregoing table, the data clearly demonstates the superiority of the reaction products contemplated herein over the individual reactants and the partial reaction products, those of only two of the individual reactants. For example, diamyl phenol does not improve the oil in this corrosion test, in fact, corrosion increases from 35 to 44 mgms.; whereas, the same quantity, ¼%, of the reaction product of diamyl phenol, benzaldehyde and ammonia reduces corrosion in the test from 35 to 4 mgms. Similarly, the results indicate that the beta-naphthol-benzaldehyde-ammonia reaction product is greatly superior to beta-naphthol and to benzaldehyde-ammonia in this test.

EXAMPLE IX

A distillate from a Rodessa crude was refined with furfural, dewaxed and filtered. It had a specific gravity of 0.856, a flash point of 420° F., and a Saybolt Universal viscosity of 151 seconds at 100° F. It is suitable for use in turbines. It was tested as follows:

Twenty-five cc. samples of the oil were heated to 200° F., with 5 liters of air per hour bubbling through them. Twenty-four inches of No. 18 gauge copper wire and 1 gram of iron granules were added to each sample. Also, 22 cc. of distilled water were added each day. The samples were tested for acidity (N. N.), color, and sludge after varying periods of time. Results are given in Table II below:

*Table II*

| Reaction product added | Per cent used | Time, hrs. | N. N. | Lov. color | Sludge, mg./25 cc. |
|---|---|---|---|---|---|
| None | | 165 | 20.3 | 320 | 251 |
| Alpha-naphthol | ⅒ | 1,006 | 19.1 | 147 | 199 |
| Alpha-naphthol-benzaldehyde-ammonia | ⅒ | 1,102 | .01 | 3 | 63 |

EXAMPLE X

In addition to the foregoing tests, I have also made comparative tests between an oil and an oil blend containing a representative improving agent of the type contemplated herein to determine the comparative behavior of the unblended oil and the improved oil under the actual operating conditions of an automotive engine. The tests were carried out in a single-cylinder Lauson engine operated continuously over a time interval of 16 hours with the cooling medium held at a temperature of about 212° F. and the oil temperature held at about 280° F. The engine was operated at a speed of about 1,830 R. P. M. At the end of the test, the oil was tested for acidity (N. N.) and viscosity.

The oil used in the test was a lubricating oil stock of 45 seconds Saybolt Universal viscosity at 210° F., and the results obtained are listed in Table III below:

*Table III*

| Reaction product added | Per cent used | N. N. | S. U. V. @ 210° F. (secs.) |
|---|---|---|---|
| None | | 5.1 | 49.9 |
| Alpha-naphthol-benzaldehyde-ammonia | ½ | 1.5 | 45.7 |

As indicated by the foregoing examples, the proportion of the improving agents contemplated herein to effect the desired improvement is small. The amounts used may, of course, be varied, depending upon the oil, the conditions of use, etc., but in general, the desired results can be obtained with an amount of improving agent ranging from about 0.1 per cent to about 1.0 per cent by weight of the oil.

It is to be understood that while I have described in detail several preferred procedures which may be followed in the preparation of the reaction products or compounds contemplated herein as oil-improving agents and have referred to various representative constituents which may be used in the preparation of these reaction products or compounds, such procedures and examples have been used for illustrative purposes only. The invention, therefore, is not to be considered as limited by the specific examples provided but includes within its scope such changes and modifications as fairly come within the spirit of the appended claims.

I claim:

1. An improved mineral oil composition comprising a mineral oil and in admixture therewith a minor proportion, sufficient to stabilize said oil against the deleterious effects of oxidation, of the reaction product obtained by the reaction of substantially one equivalent of a mono-hydroxyaromatic compound, two equivalents of an aldehyde having more than one carbon atom and one equivalent of ammonia.

2. An improved mineral oil composition comprising a mineral oil and in admixture therewith a minor proportion, sufficient to stabilize said oil against the deleterious effects of oxidation, of the reaction product obtained by the reaction of substantially one equivalent of a mono-hydroxyaromatic compound and two equivalents of an aldehyde-ammonia reaction product wherein the aldehyde has more than one carbon atom.

3. An improved mineral oil composition comprising a mineral oil and in admixture therewith a minor proportion, sufficient to stabilize said oil against the deleterious effects of oxidation, of the reaction product obtained by the reaction of substantially one equivalent of a mono-hydroxyaromatic compound, two equivalents of an aliphatic aldehyde having more than one carbon atom and one equivalent of ammonia.

4. An improved mineral oil composition comprising a mineral oil and in admixture therewith a minor proportion, sufficient to stabilize said oil against the deleterious effects of oxidation, of the reaction product obtained by the reaction of substantially one equivalent of a mono-hydroxyaromatic compound, two equivalents of acetaldehyde and one equivalent of ammonia.

5. An improved mineral oil composition comprising a mineral oil and in admixture therewith a minor proportion, sufficient to stabilize said oil against the deleterious effects of oxidation, of the reaction product obtained by the reaction of substantially one equivalent of an alkyl-substituted hydroxyaromatic compound, two equivalents of an aldehyde having more than one carbon atom and one equivalent of ammonia.

6. An improved mineral oil composition comprising a mineral oil and in admixture therewith a minor proportion, sufficient to stabilize said oil against the deleterious effects of oxidation, of the reaction product obtained by the reaction of substantially one equivalent of diamyl phenol, two equivalents of an aldehyde having more than one carbon atom and one equivalent of ammonia.

7. An improved mineral oil composition comprising a mineral oil and in admixture therewith a minor proportion, sufficient to stabilize said oil against the deleterious effects of oxidation, of the reaction product obtained by the reaction of substantially one equivalent of diamyl phenol, two equivalents of acetaldehyde and one equivalent of ammonia.

8. An improved mineral oil composition comprising a mineral oil and in admixture therewith a minor proportion, sufficient to stabilize said oil against the deterious effects of oxidation, of the reaction product obtained by the reaction of substantially one equivalent of a mono-hydroxyaromatic compound, two equivalents of an aromatic aldehyde having more than one carbon atom and one equivalent of ammonia.

9. An improved mineral oil composition comprising a mineral oil and in admixture therewith a minor proportion, sufficient to stabilize said oil against the deleterious effects of oxidation, of the reaction product obtained by the reaction of substantially one equivalent of a mono-hydroxyaromatic compound, two equivalents of benzaldehyde and one equivalent of ammonia.

10. An improved mineral oil composition comprising a mineral oil and in admixture therewith a minor proportion, sufficient to stabilize said oil against the deleterious effects of oxidation, of the reaction product obtained by the reaction of substantially one equivalent of diamyl phenol, two equivalents of benzaldehyde and one equivalent of ammonia.

11. An improved mineral oil composition comprising a mineral oil and in admixture therewith a minor proportion, sufficient to stabilize said oil against the deleterious effects of oxidation, of the reaction product obtained by the reaction of substantially one equivalent of a mono-hydroxyaromatic compound and two equivalents of an aliphatic aldehyde-ammonia reaction product wherein the aliphatic aldehyde has more than one carbon atom.

12. An improved mineral oil composition comprising a mineral oil and in admixture therewith a minor proportion, sufficient to stabilize said oil against the deleterious effects of oxidation, of the reaction product obtained by the reaction of substantially one equivalent of a mono-hydroxyaromatic compound and two equivalents of an acetaldehyde-ammonia reaction product.

13. An improved mineral oil composition comprising a mineral oil and in admixture therewith a minor proportion, sufficient to stabilize said oil against the deleterious effects of oxidation, of the reaction product obtained by the reaction of substantially one equivalent of an alkyl-substituted mono-hydroxyaromatic compound and two equivalents of an aldehyde-ammonia reaction product wherein the aldehyde has more than one carbon atom.

14. An improved mineral oil composition comprising a mineral oil and in admixture therewith a minor proportion, sufficient to stabilize said oil against the deleterious effects of oxidation, of the reaction product obtained by the reaction of substantially one equivalent of diamyl phenol and two equivalents of an aldehyde-ammonia reaction product wherein the aldehyde has more than one carbon atom.

15. An improved mineral oil composition comprising a mineral oil and in admixture therewith a minor proportion, sufficient to stabilize said oil against the deleterious effects of oxidation, of the reaction product obtained by the reaction of substantially one equivalent of diamyl phenol and two equivalents of an acetaldehyde-ammonia reaction product.

16. An improved mineral oil composition comprising a mineral oil and in admixture therewith a minor proportion, sufficient to stabilize said oil against the deleterious effects of oxidation, of the reaction product obtained by the reaction of substantially one equivalent of a mono-hydroxyaromatic compound and two equivalents of an aromatic aldehyde-ammonia reaction product.

17. An improved mineral oil composition comprising a mineral oil and in admixture therewith a minor proportion, sufficient to stabilize said oil against the deleterious effects of oxidation, of the reaction product obtained by the reaction of substantially one equivalent of a mono-hydroxyaromatic compound and two equivalents of a benzaldehyde-ammonia reaction product.

18. An improved mineral oil composition comprising a mineral oil and in admixture therewith a minor proportion, sufficient to stabilize said oil against the deleterious effects of oxidation, of the reaction product obtained by the reaction of substantially one equivalent of diamyl phenol and two equivalents of a benzaldehyde-ammonia reaction product.

19. An improved mineral oil composition comprising a mineral oil and in admixture therewith from about 0.1 weight per cent to about 1.0 weight per cent of the reaction product obtained by the reaction of a mono-hydroxyaromatic compound, an aldehyde having more than one carbon atom and ammonia.

FERDINAND PHILIP OTTO.

Certificate of Correction

Patent No. 2,403,453.　　　　　　　　　　　　　　　　　　　　　　　　July 9, 1946.

FERDINAND PHILIP OTTO

It is hereby certified that errors appear in the printed specification of the above numbered patent requiring correction as follows: Column 6, line 28, Example IX, for "22 cc." read *2 cc.*; column 7, line 61, claim 5, for "hydroxyaromatic" read *monohydroxyaromatic*; and that the said Letters Patent should be read with these corrections therein that the same may conform to the record of the case in the Patent Office.

Signed and sealed this 29th day of October, A. D. 1946.

[SEAL]

LESLIE FRAZER,
*First Assistant Commissioner of Patents.*